Jan. 31, 1961
L. FORGÓ
2,969,956
PIPE JOINT FOR HEAT EXCHANGE DEVICES
Filed Dec. 27, 1955
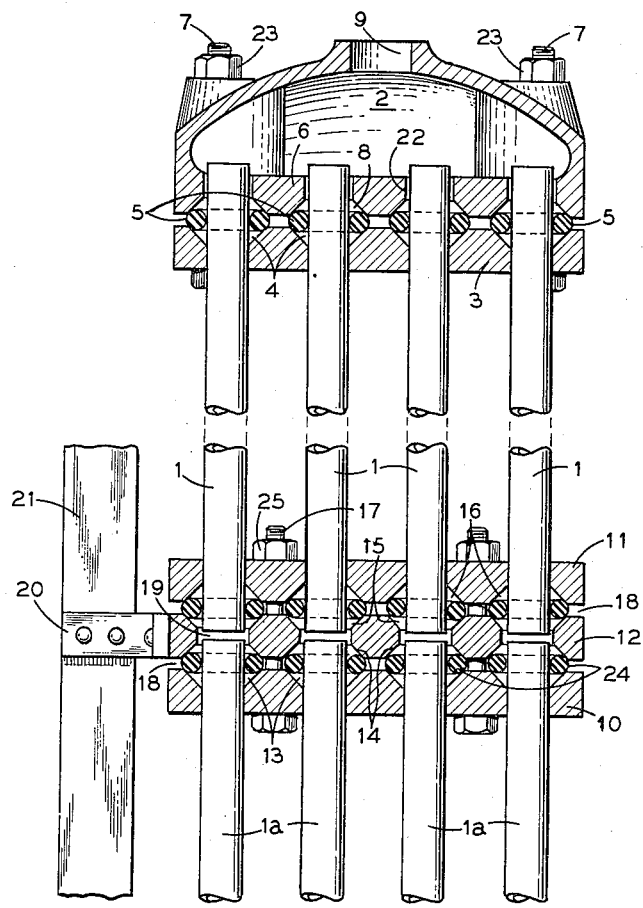
INVENTOR.
Laszló Forgó
BY
Blum, Moscovitz, Friedman, & Blum
ATTORNEYS United States Patent Office 2,969,956
Patented Jan. 31, 1961

2,969,956
PIPE JOINT FOR HEAT EXCHANGE DEVICES

Laszló Fórgó, Budapest, Hungary, assignor to Licencia Talamanyokat Ertekesito Vallalat, Budapest, Hungary, a Hungarian firm Filed Dec. 27, 1955, Ser. No. 555,682

5 Claims. (Cl. 257—224)

This invention relates to pipe joints for heat exchange devices with tubes inserted into tube plates, particularly to heat exchange devices with tubes of comparatively ductile or malleable material such as aluminum, aluminum alloys or other deformable material.

One object of the invention is to provide a joint between thin-walled tubes made of deformable material and another body, such as a tube plate which latter may form a separate body or part of any structure such as part of a header, a manifold or the like.

In connecting such thin-walled metallic tubes with another body, for example aluminum tubes with a wall-thickness of about 0.5 millimeter with a tube plate, difficulties are to be overcome, since with tubes having such thin walls neither permanent sealing effect can be obtained by means of rolling-in, nor is it possible to weld such tubes to the second body. A further difficulty consists in the fact that in heat exchangers with very long tubes the expansions due to heat inhibit the application of packing boxes of the conventional type since during the lengthening and shortening of the tubes owing to the variations of temperature the packing means would be worn out thus causing dangerous leakages and undesirable structural weakness.

It is accordingly within the contemplation of this invention to eliminate the shortcomings mentioned above and provide a joint between a thin-walled metallic tube and another body with sufficient tightness between the engaged members without rolling in or welding of the end of the tubes and thus prevent a mutual displacement of such members when the device is subjected to stresses or deformations caused by heat and consequently to obviate the danger of liquid leakage.

In the production of a leak-proof joint in heat exchangers it is a further object of the invention to avoid the danger of grinding down or thinning the wall of tubing or otherwise mutilating the tubing which is not only thin-walled but made of a material of low creep strength.

A still further object of the invention is to provide a heat exchange device for air-cooled steam condensers and surface coolers in general operating with an internal medium such as water of low pressure and consisting of tubes of very great length and therefore great dilatations caused by heat.

The pipe joint assembly according to the invention comprises at least one bank of tubes inserted into tube-plates. It is built-up of thin-walled metallic tubes, of a tube plate and of a tightening plate, the tube-plates having a hole or passage for each of said tubes, the tightening-plate having holes or passages corresponding to those in the tube-plate, said plates being assembled adjacent to one another and connected to each other by means fixing said plates in a predetermined relative position, each of said tubes passing through two holes corresponding to one another in said plates and being fixed in the tube-plate only, and packing means disposed between said tube-plates and tightly surrounding said tubes.

A preferred embodiment of the pipe joint assembly according to the invention consists of a bank of thin-walled metallic tubes, a tube-plate having separate holes or passages for each of the tubes of said bank of tubes, each of said holes consisting of a cylindrically shaped lower part and a conically shaped upper part, the two parts communicating with each other, a tightening plate associated with said tube-plate having holes in it corresponding to the holes or passages in the tube-plate, each of said holes in the tightening-plate having a conical part opposite to the conical part of the holes in the tube-plate, each tube of said bank of tubes passing through a hole in the tube-plate and through a corresponding hole in the tightening-plate and secured in the cylindrical part of the respective hole in the tube-plate, packing means inserted in each pair of said conical holes juxtaposed to one another and means connecting said plates to each other.

The structure described above is especially adapted to joints between tubes and headers or manifolds. But the structure according to the invention may also be applied in tubings for the connection of two tubes or banks of tubes with one another. For this purpose the tightening plate may be common to the adjacent ends of two banks of tubes and the plates are connected to one another by fixing means such as bolts or the like. Tubes of adjacent banks of tubes are secured in separate tube plates forming the above said first and second tube-plates and the tightening-plate is inserted between these tube-plates, the packing means being disposed between each two adjacent plates.

The conical shaped holes or parts of holes in the plates and the packing means provided between two such conical holes are of such relative proportions that while pressing the plates towards one another by means of said bolts or the like, the conical surfaces of two corresponding holes deform the packing means, preferably ring shaped members made of resilient material, and force these members into pressing engagement with the respective tube thereby enhancing the sealing effect.

A further object of this invention is to provide a simple and easily fabricated device capable of obtaining the objectives aforesaid.

The drawing shows by way of example one embodiment of the invention in a cross-sectional elevational view, forming part of a heat exchange device especially adapted for air cooled steam condensers.

In the drawing there are shown two adjacent banks of tubes 1 and 1a of the said pipe joint assembly, each bank comprising four tubes. The upper end of the upper bank of tubes 1 is connected to a header. The two juxtaposed ends of the two banks of tubes 1 and 1a are connected to one another. Both joints between the tubes and the header on one hand and between two banks of tubes on the other hand are made according to this invention.

1 designates the tubes of the upper bank of tubes tightly connected at their upper ends to a header 2 and leading the internal medium, e.g. water. For this purpose the upper ends of the tubes 1 pass through respective holes of passages of a tube-plate 3, forming a separate piece and are fixed in the cylindrical lower part of said holes. For this purpose, after having inserted the tubes 1 in the tube-plate 3 they will be expanded in any preferred manner so as to snugly fit against the surface of the cylindrical part of the holes in the tube-plate 3. This kind of fixing the tubes 1 in the holes of said tube-plate 3 may be performed in various ways, for example by means of a mandrel drawn through the upper ends of the tubes 1 after inserting them in said holes. By this expanding operation the outer surfaces of the tubes 1 are tightly pressed against the inner wall of said holes.

Each one of said holes has an upper part 4 forming a conical hole with its greatest diameter lying in the plane of the upper side of the tube-plate 3. In each of these conical holes there is provided a ring-shaped packing member 5 preferably made of natural or synthetic caoutchouc or any other suitable resilient material. A tightening of plate 6 forms the base wall of the header 2 and has also conical holes or passages 8 corresponding with the conical holes 4 in the tube-plate 3 their greatest diameter lying in the plane of the lower side of the tightening plate 6 opposite to the upper surface of the tube-plate 3. The conical holes 8 in the tightening plate 6 communicate with cylindrical holes or passages 22 in said tightening plate 6 and encompass the ends of the tubes 1. The diameter of these cylindrical holes 22 is somewhat greater than the outer diameter of the tubes 1 so that there remains a clearance between the outer surface of the end of the tubes 1 and the wall of the holes 22 as shown in the drawing. The tube-plate 3 and the header are connected to one another by fixing means such as bolts 7 and nuts 23. The conical holes 4 and 8 and the packing rings 5 are of such relative proportions that while pressing the tube plate 3 and the tightening plate 6 towards one another by means of the bolts 7 and nuts 23 the conical surfaces of the corresponding holes 4 and 8 deform the packing rings provided between them and force them into tightly sealing engagement with the outer wall of the respective tube 1 and the surfaces of the holes 4 and 8. The air-tight sealing of the joint described above is accomplished by means of the packing rings 5 only, as clearly shown in the drawing. The expanding of the tubes 1 in the cylindrical part of the holes in the tube-plate 3 has for its purpose only to secure and fix the tubes 1 in the tube-plate 3 in order to allow the movements of the header caused by the expansions caused by the heat of the tubes 1 without any relative movement between the tubes 1 and the tube-plate 3 and therefore without any relative movement between the tubes 1 and their respective packing rings 5. The opening 9 in the upper part of the header 2 serves as inlet or outlet for the internal medium flowing in the tubes 1.

The lower part of the figure shows a joint between the bank of the tubes 1 and the bank of the tubes 1a. The upper ends of the tubes 1a are inserted in a tube-plate 10 and the lower ends of the tubes 1 in a second tube-plate 11 in the same manner as the upper ends of the tubes 1 are inserted in the tube-plate 3. The tubes 1 and 1a of both banks of tubes are fixed in their respective tube-plates 11 and 10 by means of expanding the ends of the tubes and thus tightly pressing them against the inner surface of the cylindrical part of the holes. Conical holes or passages 13 in the tube-plate 10 and conical holes or passages 16 in the tube-plate 11 are shaped similar to the conical holes 4 and 8 respectively in the structure shown in the upper part of the figure.

Between the two tube-plates 10 and 11 there is provided a tightening plate 12 common to the juxtaposed ends of both banks of tubes 1 and 1a, respectively, and having conical holes or passages 14 and 15 respectively, communicating in pairs with each other through cylindrical holes or passages 19. In this embodiment of the invention the ring-shaped packing members 24 made of any suitable resilient material are disposed between each two corresponding conical holes 13, 14 and 15, 16 respectively, juxtaposed to one another. The three plates 10, 11 and 12 are connected and pressed against one another by fixing means such as bolts 17 and nuts 25. The cylindrical hole 19 in the third tube-plate 12 disposed in between the tube-plates 10 and 11 has a greater diameter than the outer diameter of the tubes 1 and 1a. Thus a clearance results between the outer surfaces of the tubes 1 and 1a and the surface of the holes 19.

The ring-shaped packing members 5 and 24 and the respective holes 4, 8 and 13—16 engaging said packing members are of such relative proportions that after assembling the three plates 10, 11 and 12 and tightening the nuts 25, a gap 18 remains between the surfaces of the plates opposite to one another. Thus the joint described can always be adjusted during operation if necessary.

In the structure shown in the drawing by way of example the tightening plate 12 disposed in between the tube-plates 10 and 11 is rigidly connected to a mast or frame 21 forming part of a cooling tower by means of a bracket 20 and rivets 26. By fixing e.g. the tightening plate 12 only, any longitudinal expansion of the tubes 1 and 1a is provided for, whereby the header 2 or any other manifold joint to the upper ends of the tubes 1 and at the lower ends of the tubes 1a freely follows such movements of the tubes.

The same result can be obtained by fixing either of the plates 10 or 11 to mast 21. The important factor is that each pair of associated tube plates and tightening plates 3 and 6 or 10, 11 and 12 forms a part of systems consisting of tube plates 3 or 10 and 11, tightening plates 6 or 12, packing members 5 or 24 and fixing means 7, 23 or 17, 25, respectively, and these systems are interconnected only by the tubes 1 or 1 and 1a, respectively, whereas only one of these systems is fixed to the mast or frame so that, upon thermal expansion of the tubes, the tightening systems are mutually displaceable without mutual movements of the tubes 1 and 1a and their packing members 5 and 24.

Thus, one of the advantages of the structure described consists in the possibility of building heat exchange devices, especially such devices operating with an internal medium of low pressure, with tubes made of materials of low creep strength, such as aluminum or aluminum alloys and having a wall-thickness of about 0.5–1 millimeter. The packing means provided in the joint described are not subjected to any abrasion. The pipe joint according to this invention is applicable not only for banks of tubes. It is well adapted to connect a single tube with another body such as a manifold or any other fitting.

In the above description the invention has been disclosed merely by way of example and in preferred manner; but obviously many variations and modifications may be made therein which will still be comprised within its spirit. It is to be understood, therefore, that the invention is not limited to any specific form or manner of practicing same, except in so far as such limitations are specified in the appended claims.

What I claim is:

1. A tube-joint assembly for heat exchangers comprising, in combination, a support structure; a tube plate formed with tube receiving apertures; plural greatly elongated relatively thin-walled tubes having their ends extending through the tube plate apertures, and mechanically anchored in the tube plate; a tightening plate spaced beyond said tube plate and having tube receiving apertures respectively aligned with those in said tube plate, the ends of said tubes extending through the tube plate apertures extending into the tightening plate apertures; the tightening plate apertures having diameters sufficiently in excess of the tube outer diameters for free movement of the tube ends axially of the tightening plate apertures; said tube plate being anchored only to said tubes and being freely movable with said tubes, relative to said tightening plate; during expansion and contraction of said tubes; compressible packing means embracing the tubes between said plates and seated on said tube plate; means operable to draw said plates toward each other to compress said packing means to provide a leakproof assembly of said tubes to said tube plate; and bracket means anchoring said tightening plate to said support structure to hold said tightening plate against movement relative to said support structure; whereby said tube plate is free of connection to any element having a temperature differing from the temperature of said tubes, so that said tubes and said tube plate will move as a fixed unit with said packing means relative to said tightening plate to inhibit abrasion of said packing means by said tubes.

2. A tube-joint assembly for heat exchangers comprising, in combination a support structure; a tube plate formed with tube receiving apertures; plural greatly elongated relatively thin-walled tubes having their ends extending through the tube plate apertures and mechanically anchored in the tube plate, a tightening plate spaced beyond said tube plate and having tube receiving apertures respectively aligned with those in said tube plate, the ends of said tubes extending through the tube plate apertures extending into the tightening plate apertures; each of said plates being formed with annular conical recesses in their facing surfaces concentric with the respective apertures; the tightening plate apertures having diameters sufficiently in excess of the tube outer diameters for free movement of the tubes axially of the tightening plate apertures; said tube plate being anchored only to said tubes and being freely movable with said tubes during expansion and contraction of the latter; compressible packing means embracing the tubes between said plates and seated in said facing conical recesses for movement with said tube plate; means operable to draw said plates toward each other to compress said packing means to provide a leakproof assembly of said tubes to said tube plate; and bracket means anchoring said tightening plate to said support structure to hold said tightening plate against movement relative to said support structure; whereby said tube plate is free of connection to any element having a temperature differing from the temperature of said tubes, so that said tubes and said tube plate will move as a fixed unit with said packing means relative to said tightening plate to inhibit abrasion of said packing means by said tubes.

3. A tube-joint assembly as claimed in claim 2 in which said packing means comprises individual packing rings of circular cross-section, each embracing one of said tubes.

4. A tube-joint assembly as claimed in claim 2 in which said tightening plate has such conical recesses in both of its surfaces; a second tube plate substantially identical with said first mentioned tube plate disposed on the opposite side of said tightening plate from said first mentioned tube plate; second plural greatly elongated relatively thin-walled tubes having ends extending through the second tube plate apertures and into the tightening plate apertures in alignment with the first mentioned tubes, and mechanically anchored in the second tube plate; said second tube plate being anchored only to said second tubes and being freely movable with said second tubes during expansion and contraction of the latter and compressible packing means embracing the second tubes between said tightening plate and said second tube plate; and means operable to draw said tube plates toward each other to compress said packing means to provide leakproof assemblies of the tubes to the respective tube plates whereby said two tube plates are free of connection to any element having a temperature differing from the temperatures of the respective tubes connected to the respective tube plates.

5. A tube-joint assembly as claimed in claim 4 in which said second mentioned packing means comprises individual packing rings embracing each one of said second tubes and seated in the facing conical recesses of said second tube plate and said tightening plate.

References Cited in the file of this patent
UNITED STATES PATENTS

| | | |
|---|---|---|
| 1,101,634 | Kempster | June 30, 1914 |
| 1,183,312 | Martin | May 16, 1916 |
| 1,574,956 | De La Mare | Mar. 2, 1926 |
| 1,709,837 | Bulmahn | Apr. 23, 1929 |
| 2,260,638 | Pfost | Oct. 28, 1941 |
| 2,676,038 | McConnell | Apr. 20, 1954 |
| 2,735,698 | Brimen | Feb. 21, 1956 |

FOREIGN PATENTS

| | | |
|---|---|---|
| 238,734 | Switzerland | Nov. 16, 1945 |
| 315,934 | Great Britain | July 25, 1929 |
| 541,980 | Germany | Mar. 10, 1929 |
| 805,470 | Germany | Mar. 15, 1951 |